(12) United States Patent
Kuruoglu et al.

(10) Patent No.: US 7,712,028 B2
(45) Date of Patent: May 4, 2010

(54) USING ANNOTATIONS FOR SUMMARIZING A DOCUMENT IMAGE AND ITEMIZING THE SUMMARY BASED ON SIMILAR ANNOTATIONS

(75) Inventors: Ercan E. Kuruoglu, Pisa (IT); Alex S. Taylor, Guilford (GB)

(73) Assignee: Xerox Corporation, Norwalk, CT (US)

( * ) Notice: Subject to any disclaimer, the term of this patent is extended or adjusted under 35 U.S.C. 154(b) by 1447 days.

(21) Appl. No.: 09/982,024

(22) Filed: Oct. 19, 2001

(65) Prior Publication Data
US 2004/0034835 A1 Feb. 19, 2004

(51) Int. Cl.
G06F 17/21 (2006.01)
(52) U.S. Cl. .................. 715/254; 715/230; 715/268
(58) Field of Classification Search .............. 715/500, 715/530–531, 230, 254–256, 268, 860, 863–866; 382/229, 173, 176; 358/1.1
See application file for complete search history.

(56) References Cited

U.S. PATENT DOCUMENTS

| | | | |
|---|---|---|---|
| 3,714,636 A * | 1/1973 | Manly .................. 715/530 |
| 3,781,816 A * | 12/1973 | Coleman et al. ........... 358/1.1 |
| 5,347,295 A * | 9/1994 | Agulnick et al. ........... 345/156 |
| 5,384,703 A | 1/1995 | Withgott et al. ........... 715/531 |
| 5,384,863 A | 1/1995 | Huttenlocher et al. ....... 382/173 |
| 5,491,760 A | 2/1996 | Withgott et al. ........... 382/203 |
| 5,570,435 A | 10/1996 | Bloomberg et al. ......... 382/283 |
| 5,638,543 A | 6/1997 | Pedersen et al. ............... 709/1 |
| 5,659,639 A * | 8/1997 | Mahoney et al. ............ 382/309 |
| 5,666,139 A * | 9/1997 | Thielens et al. ............. 345/173 |
| 5,687,254 A | 11/1997 | Poon et al. .................. 382/229 |
| 5,689,716 A | 11/1997 | Chen .......................... 715/500 |
| 5,748,805 A | 5/1998 | Withgott et al. ............. 382/206 |
| 5,848,191 A | 12/1998 | Chen et al. .................. 382/229 |
| 5,867,164 A * | 2/1999 | Bornstein et al. ........... 715/530 |
| 6,032,137 A * | 2/2000 | Ballard ........................ 705/75 |
| 6,279,014 B1 * | 8/2001 | Schilit et al. ................ 715/512 |
| 6,317,708 B1 * | 11/2001 | Witbrock et al. ............... 704/9 |
| 6,397,194 B1 * | 5/2002 | Houvener et al. ............ 705/16 |
| 6,533,822 B2 * | 3/2003 | Kupiec ....................... 715/531 |
| 6,671,684 B1 * | 12/2003 | Hull et al. ...................... 707/6 |
| 6,687,876 B1 * | 2/2004 | Schilit et al. ................ 715/512 |
| 6,751,779 B1 * | 6/2004 | Kurosawa et al. ........... 715/520 |
| 6,859,909 B1 * | 2/2005 | Lerner et al. ................ 715/512 |

(Continued)

OTHER PUBLICATIONS

F. R. Chen et al., "Extraction of Thematically Relevant Text from Images," *Fifth Annual Symposium on Document Analysis And Information Retrieval*, Apr. 15-17, 1996, Las Vegas, Nevada.

(Continued)

*Primary Examiner*—Cesar B Paula
(74) *Attorney, Agent, or Firm*—Oliff & Berridge, PLC

(57) ABSTRACT

A summary of a captured document image is produced on the basis of detected handwritten annotations made to a document prior to image capture. The scanned (or otherwise captured) image is processed to detect annotations made to the document prior to scanning. The detected annotations can be used to identify features, or text, for use to summarize that document. Additionally, or alternatively, the detected annotations in one document can be used to identify features, or text, for use to summarize a different document. The summary may be displayed in expandable detail levels.

20 Claims, 3 Drawing Sheets

U.S. PATENT DOCUMENTS

| | | | |
|---|---|---|---|
| 6,909,805 B2* | 6/2005 | Ma et al. | 382/170 |
| 2002/0078088 A1* | 6/2002 | Kuruoglu et al. | 707/512 |
| 2002/0138476 A1* | 9/2002 | Suwa et al. | 707/3 |
| 2003/0048949 A1* | 3/2003 | Bern et al. | 382/218 |
| 2003/0070139 A1* | 4/2003 | Marshall et al. | 715/512 |

OTHER PUBLICATIONS

F. R. Chen et al., "Summarization of Imaged Documents without OCR," *Computer Vision and Image Understanding*, vol. 70, No. 3 pp. 307-320, Jun. 1998.

C. Hass, *Writing Technology: Studies on the Materiality of Literacy*, The Pennsylvania State University, Lawrence Erlbaum Associates Publishers, Mauwah, New Jersey, 1996.

J. Kupiec et al., "A Trainable Document Summarizer," SIGIR95, 1995.

H.J. Muller et al., "Reflexive and Voluntary Orienting of Attention: Time Course Activation and Resistance to Interruption," *Journal of Experimental Psychology: Human Perception and Performance*, V. 15, No. 2, pp. 315-330, 1989.

W. Newman et al., "CamWorks: A Video-based Tool for Efficient Capture from Paper Source Documents," *IEEE International Conference on Multimedia Computing and Systems (ICMCS)*, Florence, Italy, Jun. 7-11, 1999.

M.N. Price et al., "Linking by Inking: Trailblazing in a Paper-like Hypertext," *In Proceedings of Hypertext '98*, ACM Press, pp. 30-39, Jun. 20-24, 1998, Pittsburgh, PA.

B.N. Schiilit et al., "As We May Read: The Reading Appliance Revolution," *IEEE Computer*, vol. 32, No. 1 pp. 65-73, Jan. 1999.

B.N. Schiilit et al., "Beyond Paper: Supporting Active Reading with Free Form Digital Ink Annotations," *In Proceedings of CHI 98*, ACM Press, pp. 249-256, 1998.

* cited by examiner

USING ANNOTATIONS FOR SUMMARIZING A DOCUMENT IMAGE AND ITEMIZING THE SUMMARY BASED ON SIMILAR ANNOTATIONS

CROSS-REFERENCE TO RELATED APPLICATIONS

Cross-reference is made to U.S. patent application Ser. No. 09/981,835, entitled "Method And Apparatus For Forward Annotating Documents", (NOW ABANDONED) which is hereby incorporated herein by reference.

BACKGROUND OF THE INVENTION

1. Field of the Invention

This invention relates to processing a scanned image of a document (for example a paper document) to generate a document summary from the scanned image.

2. Description of Related Art

There are many occasions in which it would be desirable to compile automatically a summary of a document. Several approaches for such systems have been proposed in the prior art.

For example, European Patent Application EP 0902379 A2 describes a technique in which a user is able to mark certain words or phrases in an electronic version of a document (for example ASCII text), which the system then extracts to compile a document summary. However, such a system requires the user to work with an electronic version of the document. Furthermore, the document must already exist in the electronic form before any words or phrases can be selected by the user.

Regarding the summarizing of paper documents (or scanned images of paper documents), reference may be made to the following documents:

U.S. Pat. Nos. 5,638,543 and 5,689,716 describe systems in which paper document images are scanned and the images are processed using optical character recognition (OCR) to produce a machine-readable version of the document. A summary is generated by allocating "scores" to sentences depending on critical or thematic words detected in the sentence. The summary is generated from the sentences having the best scores.

U.S. Pat. No. 5,848,191 describes a system similar to U.S. Pat. No. 5,689,716 using scores to rank sentences, the score being dependent on the number of thematic words occurring in a sentence. However, in U.S. Pat. No. 5,848,191, the summary is generated directly from the scanned image without performing OCR.

U.S. Pat. No. 5,491,760 describes a system in which significant words, phrases and graphics in a document image are recognized using automatic or interactive morphological image recognition techniques. A document summary or an index can be produced based on the identified significant portions of the document image.

"Summarization Of Imaged Documents Without OCR" by Chen and Bloomberg, in Computer Vision and Image Understanding, Vol. 70, No. 3, June 1998, on pages 307-320, describes an elaborate technique based on feature extraction and scoring sentences based on the values of a set of discrete features. Prior information is used in the form of feature vector values obtained from summaries compiled by professional human summary compilers. The sentences to be included in the summary are chosen according to the score of the sentence.

The above paper based techniques all employ variations of statistical scoring to decide (either on the basis of OCR text or on the basis of image maps) which features, or sentences, should be extracted for use in the complied summary.

SUMMARY OF THE INVENTION

In contrast to the above techniques, one aspect of the present invention is to generate a summary of a captured (e.g., scanned) image of a document on the basis of detected handwritten or electronic annotations made to a document prior to scanning.

In more detail, the captured image is processed to detect annotations made to the document prior to image capture. The detected annotations can be used to identify features, or text, for use to summarize that document. Additionally or alternatively, the detected annotations in one document can be used to identify features, or text, for use to summarize a different document.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION

Figure 1:
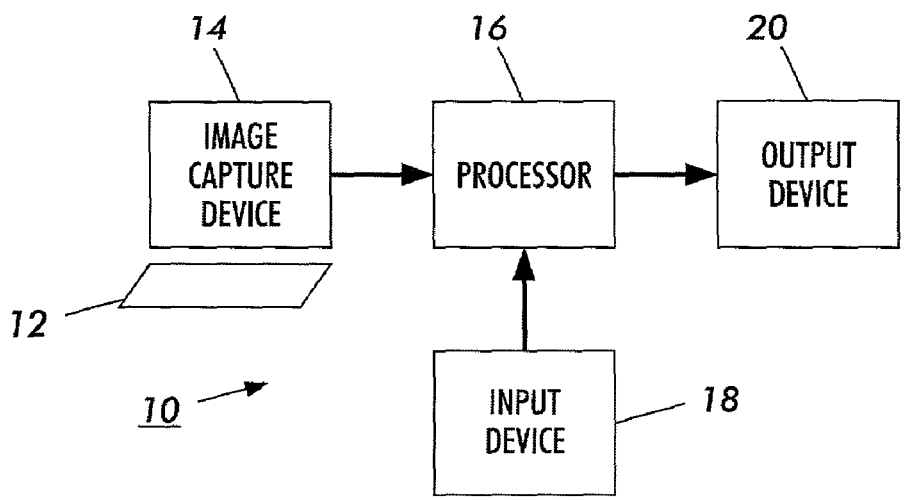
FIG. 1 is a schematic block diagram of a first embodiment for processing a paper document to generate a summary of the document.

Referring to FIG. 1, a system 10 is illustrated for generating a summary from a paper document 12. The system comprises an optical capture device 14 for capturing a digital image (for example a bitmap image) of each page of the paper document 12. The capture device 14 may be in the form of a digital camera, or a document scanner.

The system 10 also includes a processor 16 for processing the captured digital image to generate a summary therefrom. The processor is coupled to one or more operator input devices 18 (for example, a keyboard, or a pointing device) and also to one or more output devices 20 for outputting the generated summary. The output devices 20 may, for example, include a display unit and/or a printer.

In contrast to the prior art, one of the principles of this embodiment is to generate the summary on the basis of annotations made by hand to the paper document prior to scanning (or capture) by the optical capture device 14. The processor 16 processes the digital image to detect hand annotations indicating areas of interest in the paper document. Text or other features indicated by the annotations are extracted and used to compile the summary. The summary therefore reflects the areas of interest identified by the hand annotations in the paper document.

Figure 2:
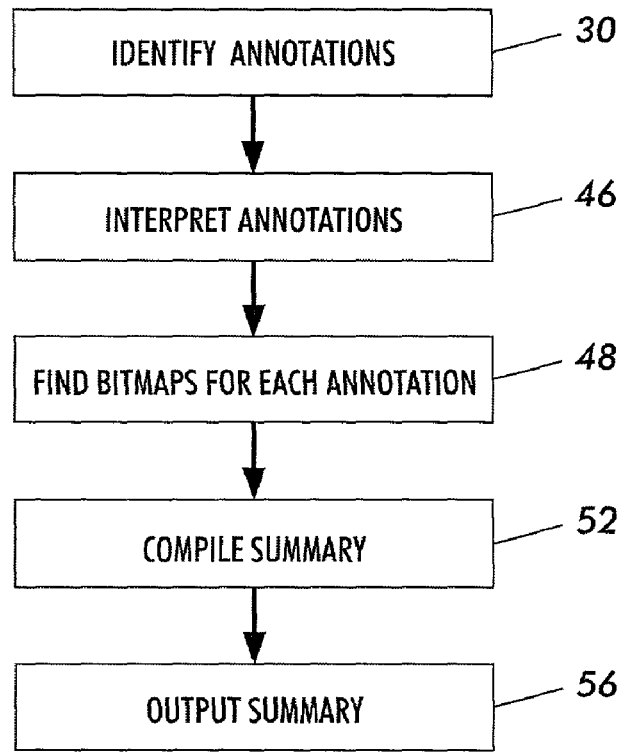
FIG. 2 is a schematic flow diagram showing the process for generating the summary.

Referring to FIG. 2, the process for creating the summary by the processor 16 comprises a first step 30 of identifying in the captured digital image, the annotations made by the user. Suitable techniques for identifying annotations are described, for example, in U.S. Pat. Nos. 5,570,435, 5,748,805 and 5,384,863, the contents of which are incorporated herein by reference. These patents disclose techniques for distinguishing regular machine printing from handwritten marks and annotations.

Figure 3:
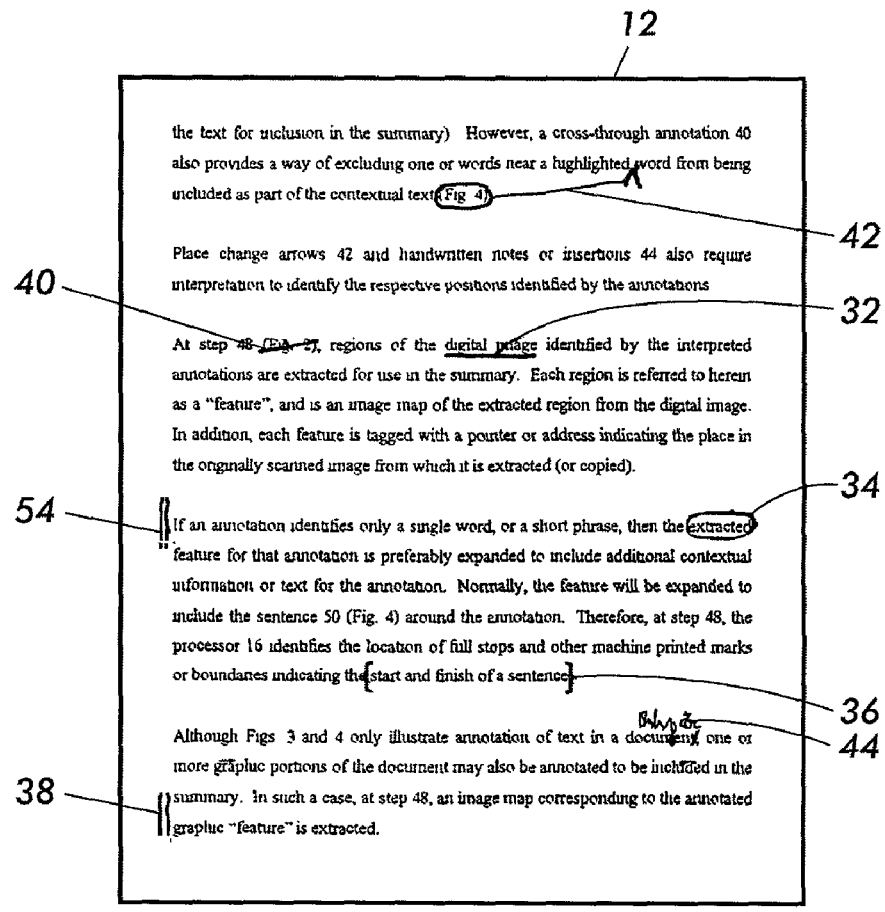
FIG. 3 is a schematic view of an annotated page of a document.

FIG. 3 illustrates the kind of hand annotations which can be identified typically, which include underlining 32, circling 34, bracketing 36, margin bracketing or marking 38, cross-through 40, anchored arrows indicating place changes 42, and handwritten notes or insertions 44.

At step 46 (FIG. 2), interpretation of the annotations is carried out. The level of interpretation may vary from one embodiment to another, depending on the complexity of annotation permitted by the system 10. For example, simple word underlining 32 or circling 34 does not need interpretation, as the words are identified directly by the annotations. Bracketing 36 and margin marking 38 requires only simple interpretation as identifying the entire text spanned by the brackets or marking.

Figure 4:
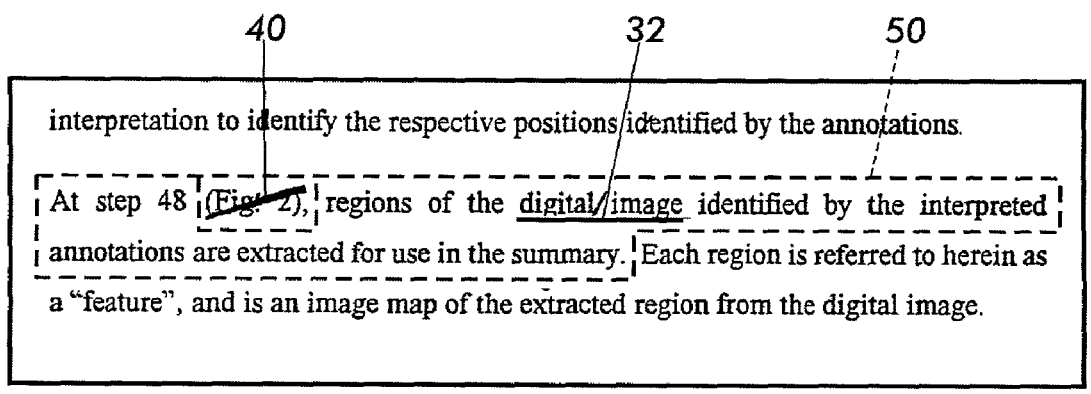
FIG. 4 is an enlarged schematic view of a portion of FIG. 3 illustrating extraction of a sentence.

Cross-through annotations 40 are preferably interpreted as a negative annotation, for excluding the crossed-through text from the summary. This may be regarded in one respect as being equivalent to no annotation at all (and hence not drawing any focus to the text for inclusion in the summary). However, a cross-through annotation 40 also provides a way of excluding one or more words near a highlighted word from being included as part of the contextual text (FIG. 4).

Place change arrows 42 and handwritten notes or insertions 44 also require interpretation to identify the respective positions identified by the annotations.

At step 48 (FIG. 2), regions of the digital image identified by the interpreted annotations are extracted for use in the summary. Each region is referred to herein as a "feature", and is an image map of the extracted region from the digital image. In addition, each feature is tagged with a pointer or address indicating the place in the originally scanned image from which it is extracted (or copied).

If an annotation identifies only a single word, or a short phrase, then the extracted feature for that annotation is preferably expanded to include additional contextual information or text for the annotation. Normally, the feature will be expanded to include the sentence 50 (FIG. 4) around the annotation. Therefore, at step 48, the processor 16 identifies the location of full stops and other machine printed marks or boundaries indicating the start and finish of a sentence.

Although FIGS. 3 and 4 only illustrate annotation of text in a document, one or more graphic portions of the document may also be annotated to be included in the summary. In such a case, at step 48, an image map corresponding to the annotated graphic "feature" is extracted.

At step 52, the summary is compiled from the extracted features. The summary may be compiled in the form of image maps of the extracted features, or text portions of the features may be OCR processed to generate character-codes for the text. Similarly, handwritten notes or insertions may be OCR processed to generate character-codes, or they may be used as image maps.

During compilation, any further interpretation of the annotations which may be required can be carried out. For example, any crossed-through text can be deleted (removed) from the summary (for example, the crossed through text 40 in FIG. 4).

Additionally, during compilation, identically annotated features may be itemized, for example, with bullets. For example, sentences containing circled words may be organized together as a bulleted list. Such an operation is preferably a user controllable option, but this can provide a powerful technique enabling a user to group items of information together in the summary simply by using the same annotation for marking the information in the original document.

Additionally, during compilation, parts of the summary may be highlighted as important, based on the annotations made by hand. For example, annotations such as an exclamation mark (54 in FIG. 3) or double underlining may be included in the summary as importance marking, for example, by bold or underlined text, or text in a different color.

At step 56, the compiled summary is outputted, for example, on the user's display or printer.

Figure 5:
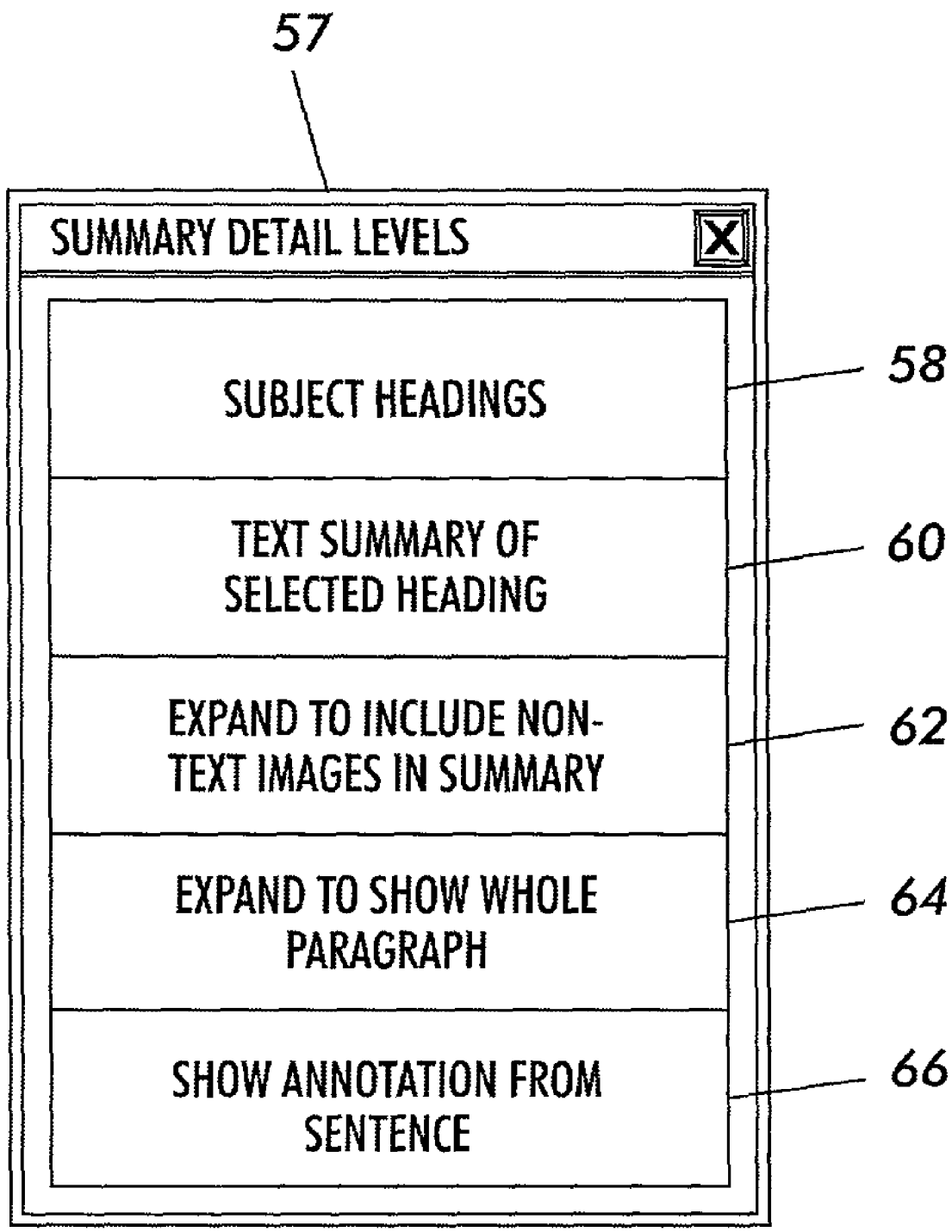
FIG. 5 is a schematic diagram illustrating options for displaying the summary.

In this embodiment, the system 10 provides a plurality of layered detail levels in a window 57 for the summary, indicated in FIG. 5. These layers may be applied either during compilation, or during outputting of the summary information.

The lowest detail level 58 merely includes any subject headings extracted from the document.

By clicking on any subject heading, the subject heading is expanded to its second detail level 60 to generate the text summary of that appropriate section of the document. The second detail level 60 only includes text features. However, by clicking again, the summary is expanded (third detail level 62) to include non-text features as part of the summary, such as annotated figures from that section of the document.

By clicking on any sentence, the summary is expanded (fourth detail level 64) to display further context for the sentence, for example, by displaying the paragraph containing the sentence.

In a final layer (fifth detail level 66), the annotation associated with any sentence in the document may be "retrieved" by clicking on the sentence.

In an alternate embodiment the plurality of layered detail levels for the summary may be accessed simply by clicking on each level of detail set forth in the window 57 shown in FIG. 5. That is window 57 may be used to both indicate a current level of detail being used to summarize a document as well as access a particular level of detail.

In the present embodiment, the summary is based on annotations made to the document to be summarized. However, in other embodiments, the summary may be made based on annotations made to a different document, for example, a previously annotated document or a master document. In such an embodiment, a first document is annotated by hand, and the annotations are detected and stored by the system 10. A second document is then captured by the system, and the second document is processed based on the annotations detected from the first document. In other words, the annotations detected in the first document are used as a guide for generation of the abstract of the second document (in the same manner as if the hand annotations had been made to the second document). Further information about this technique is described in U.S. patent application Ser. No. 09/981,835 entitled "Method And Apparatus For Forward Annotating Documents", (NOW ABANDONED) which is hereby incorporated herein by reference.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

The invention claimed is:

1. An apparatus for generating a summary of a document, comprising:
    an image capture device for capturing an original image of a document;
    a processing device for detecting annotations made to the document prior to image capture, the annotations identifying lesser portions of text to be extracted from machine generated text of the original image of the document, the processing device determining the lesser portions of text of the document identified by the annotations to be extracted, and extracting only the lesser portions of text from the machine generated text from the original image of the document identified by the detected annotations;
    a summary generator for generating a summary including only the extracted lesser portions of text from the machine generated text of the document, the summary being a condensed version of the machine generated text of the original image of the document and being generated as a separate electronic image document that is different from the original image; and
    an image output device coupled to the summary generator and that outputs the summary for review by a user, the image output device being one of a display screen and a printer,
    wherein the extracted lesser portions are itemized at least based on similar annotations.

2. The apparatus according to claim 1, wherein the summary generator is operative to generate a summary of the same document as that on which the annotations are detected.

3. The apparatus according to claim 1, wherein the summary generator is operative to generate a summary of a different document as that on which the annotations are detected.

4. The apparatus according to claim 3, wherein the image capture device is operative to capture an image of a second document to be summarized based on the detected annotations from a first document.

5. The apparatus according to claim 1, wherein the processing device is operative to identify an image region associated with a detected annotation.

6. The apparatus according to claim 5, wherein the image region represents a sentence in the document image to provide context for the identified annotation.

7. The apparatus according to claim 1, wherein the summary generator is operative to generate a summary comprising hidden portions, each portion selectively expandable to increase the information in that portion of the summary.

8. The apparatus according to claim 1, wherein the summary includes expandable detail levels.

9. The apparatus according to claim 1, wherein the summary includes extracted image maps of the original image of the document.

10. The apparatus according to claim 1, wherein the summary includes at least one of a pointer and an address indicating a place in the original image of the document from which the extracted portions are extracted.

11. A method of generating a summary of a document, comprising:
    capturing an original image of a document;
    detecting annotations made to the document prior to image capture, the annotations identifying lesser portions of text to be extracted from machine generated text of the original image of the document;
    determining the lesser portions of text of the document identified by the annotations to be extracted;
    extracting only the lesser portions of text from the machine generated text from the original image of the document identified in the determining step; generating a summary including only the lesser extracted portions of text from the machine generated text of the document, the summary being a condensed version of the machine generated text of the original image of the document and being generated as a separate electronic image document that is different from the original image; and
    outputting the summary for review by the user by either displaying the summary on a display screen or printing the summary on a recording medium with a printer,
    wherein the extracted lesser portions are itemized at least based on similar annotations.

12. A method according to claim 11, wherein the document summarized is the document on which the annotations are detected.

13. A method according to claim 11, wherein the document summarized is a different document from that on which the annotations are detected.

14. A method according to claim 13, further comprising capturing an image of a second document to be summarized based on the detected annotations from the first document.

15. A method according to claim 11, wherein said detection comprises identifying an image region associated with a detected annotation.

16. A method according to claim 15, wherein the image region represents a sentence in the document image to provide context for the identified annotation.

17. A method according to claim 11, further comprising generating a summary comprising hidden portions, each portion selectively expandable to increase the information in that portion of the summary.

18. The method according to claim 11, wherein generating the summary includes providing the summary in expandable detail levels.

19. The method according to claim 11, wherein generating the summary includes extracting image maps of the original image of the document.

20. The method according to claim 11, wherein generating the summary includes providing at least one of a pointer and an address indicating a place in the original image of the document from which the extracted portions are extracted.

* * * * *